May 25, 1965

M. CAMRAS 3,185,775

ORIENTED TAPE

Filed March 10, 1958

Inventor
Marvin Camras by Hill, Sherman, Meroni, Gross & Simpson Attys.

United States Patent Office 3,185,775
Patented May 25, 1965

3,185,775
ORIENTED TAPE
Marvin Camras, Glencoe, Ill., assignor to IIT Research Institute, a corporation of Illinois
Filed Mar. 10, 1958, Ser. No. 720,289
20 Claims. (Cl. 179—100.2)

This invention relates to a method of making a magnetic tape record member and to a tape record member produced thereby.

One embodiment of the present invention relates to the concept of particularly orienting the magnetizable particles of a magnetic record member generally in correspondence with the magnetic field to be impressed on the magnetizable portion of the member. Specifically, for a longitudinal gap magnetic transducer head, it is contemplated that the record member will preferably comprise a first layer adjacent the non-magnetic base having particles oriented generally longitudinally of the record member in combination with an outer layer having magnetizable particles oriented generally normal to the plane of the record member.

In accordance with a second embodiment of the invention there is provided a magnetic record member having a layer of particles of superior permanent magnetic properties, surmounted by a layer containing finer grain magnetic particles.

A third embodiment of the invention resides in the provision of a magnetic record member having a first layer of oriented particles in combination with an outer layer of fine grain magnetic particles.

A record media in accordance with the teachings of the present invention provides strikingly better high frequency response. Further, a unique means is afforded for controlling the frequency response characteristics of magnetic record media.

Improved output level and higher signal-to-noise ratio are also obtained.

It is an object of the present invention to provide a novel magnetic record member having strikingly better high frequency response than prior art record media.

A further object of the present invention is to provide a novel method for producing a magnetic record member.

Another object of the invention is to provide a record medium having magnetizable particles oriented in general correspondence to the configuration of the magnetic field to be recorded.

It is also an object of the invention to provide a magnetic record member having a lower noise level at high frequencies than prior art oriented magnetic record media.

Still another object of the invention is to provide a record member providing a higher signal-to-noise ratio and a greater output than previously known record members.

A still further object of the invention is to provide a unique means for controlling the frequency response characteristics of magnetic record media.

A feature of the present invention resides in the provision of a tape record composed of two layers, one of which is oriented for maximum low frequency output and the other of which provides improved high frequency response.

Another feature comprises a record tape with a plurality of layers, the layer immediately adjacent the head being oriented perpendicular to the tape surface, and another layer being oriented in the direction of relative tape motion.

Other objects, features and advantages of the present invention will be apparent from the following detailed description taken in connection with the following drawings, in which.

As shown on the drawings.

Figure 1:
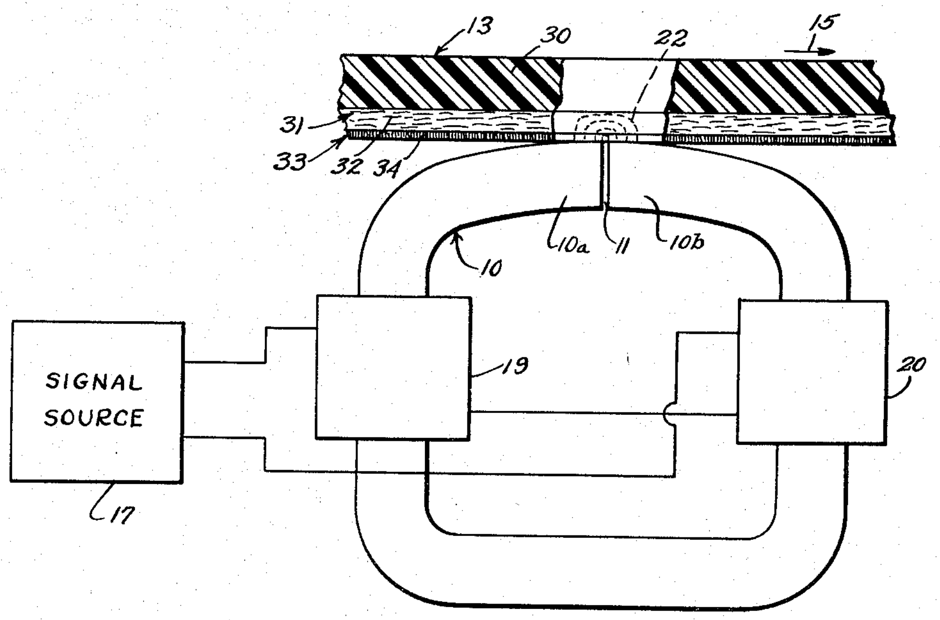
FIGURE 1 is a diagrammatic illustration of a tape record member in accordance with the present invention in operative relation to a magnetic transducer having a longitudinal gap.

The present invention is particularly applicable to tape records for utilization with confronting pole type magnetic transducer heads such as illustrated in FIGURE 1. This type of head may comprise a magnetic core 10 having a non-magnetic gap 11 defined by a pair of pole portions 10*a* and 10*b* across which the tape record member 13 successively travels in the direction of the arrow 15. During recording, an electrical signal is supplied from a suitable signal source 17 to a pair of windings 19 and 20 linking the core 10 in such a manner as to establish a recording field at the gap 11 as indicated by the dash lines 22.

In FIGURE 1, the record member 13 comprises a base 30 having a first layer 31 including magnetizable particles such as indicated at 32 which are elongated and are oriented in the direction of travel of the record member, and having a second layer 33 including magnetizable particles 34 of elongated configuration which are oriented substantially normal to the plane of the record member 13 and at right angles to the direction of travel indicated by the arrow 15.

It will be observed that the layer 33 which is preferably in sliding contact with the poles 10*a* and 10*b* will have its particles 34 extending substantially normal to the pole surfaces contacting the layer. As indicated, the magnetic fields at this region will be generally normal to the pole surfaces 10*a* and 10*b*, so that the magnetizable particles such as 34 will extend substantially parallel to the direction of the field 22 where the layer 33 intersects the field.

On the other hand, in the region of the layer 31, the field 22 will extend generally parallel to the direction of travel of the record member indicated by the arrow 15, so that individual particles of this layer such as indicated diagrammatically at 32 will extend generally parallel to the portion of magnetic field 22 with which these particles intersect. After having been subjected to the recording process, the record member retains a pattern of flux which follows the generally curved pattern of the magnetic recording field indicated at 22 in FIGURE 1, the flux pattern being mainly longitudinal in the deeper layer 31 and vertical in the surface layer 33. The orientation of the particles 32 and 34 is thus more nearly in the direction of retained flux than can be achieved by prior art oriented record media.

By way of example, the particles may be made in accordance with the examples given in my prior Patent No. 2,694,656 issued November 16, 1954. Alternatively, the magnetizable layers 31 and 33 may be composed of elongated chains of smaller particles, the chains being oriented as indicated at 32 and 34 in FIGURE 1.

In applying the particles 32 to the base 30 to form the layer 31, the particles may be suspended in a binder, applied to the tape and then subjected to a longitudinal magnetic field which orients them in the direction of tape motion. Suitable examples of binders and other information relating to the forming of an oriented layer of this type may be found in U.S. Patent No. 2,711,901, issued June 28, 1955. After the particles of layer 31 have set, the second layer of particles as indicated at 33 is applied in the same manner but in this case a vertical magnetic field is applied to the newly formed layer which orients the particles 34 in a direction perpendicular to the outer magnetic surface of the tape.

By way of example, the layer 31 may have a thickness approximately equal to the distance between the edges of the poles 10*a* and 10*b* defining the gap 11 in FIGURE 1. If the gap between poles 10*a* and 10*b* is equal to .00025 inch, the layer 31 may have a thickness in the direction normal to the tape of the order of .00025 inch. The layer 33 may have a thickness of the order of .00005 to .0001 inch.

The output at low and medium frequencies corresponding to long and medium wavelengths is influenced mainly by the longitudinally oriented layer 31. Hence for maximum output at these frequencies it is advantageous to make layer 31 thicker than layer 33. At relatively high frequencies, layer 33 is the determining factor as to output level, since layer 31 does not substantially contribute to reproduction at wavelengths approximately equal to or less than the thickness of layer 33.

The outside layer 33 may be quite thin in comparison with layer 31 and high frequencies corresponding to wavelengths approximating the thickness of layer 33 or smaller will still be adequately reproduced.

With the head-tape configuration of FIGURE 1, the recording field in the surface layer 33 of the tape is more nearly vertical, while it is more nearly longitudinal in the layer 31 remote from the head. Thus, each layer will operate to best advantage with the orientation described, contributing to maximum output at both long and short wavelengths.

The frequency response characteristics of a magnetic record member in accordance with the present invention can be varied by adjustment of the relative and actual thickness of the layers 31 and 33. Thus various grades of record tapes can be manufactured, designed to favor either relatively low or relatively high frequencies.

Figure 2:
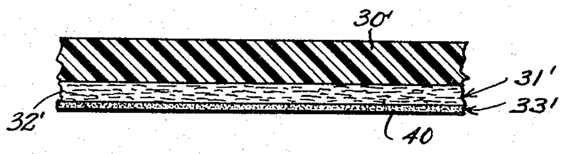
FIGURE 2 is a diagrammatic illustration of a different type of record member.

It has been found that for best resolution and short wavelength response, and for a more favorable signal-to-noise ratio at short wavelengths, a fine grain material such as indicated at 40 in FIGURE 2 is desirable as a surface layer 33′ in conjunction with a longitudinally oriented layer 31′ corresponding to the layer 31 shown in FIGURE 1. A suitable fine grain material is described in my patent application Serial No. 114,677 filed September 8, 1949 and can be made in sizes from 0.03 to 0.01 micron or smaller (one micron equals one millionth of a meter) as compared to the 1.5 to 0.25 micron particles described in my aforementioned Patent No. 2,694,656. The fine grain overlayer 33′ of FIGURE 2 may or may not be oriented and may be of cubic or elongated form high coercive material as described in the aforementioned patent or patent application. In any event, the outer layer 33′ is considerably finer than the oriented layer below it designated 31′. The layer 31′ may comprise particles 32′ of acicular material or of high coercive force cubic material as described in the aforementioned patent or patent application respectively. An oriented acicular undercoat as indicated at 31′ when coupled with a thin or thinner fine grain top layer such as indicated at 33′ will provide superior response at all wavelengths compared to prior art tapes. At the same time the noise level in the high frequency spectrum is markedly superior to prior art tapes of longitudinal orientation. Further, lower noise and better resolution are obtained.

Figure 3:
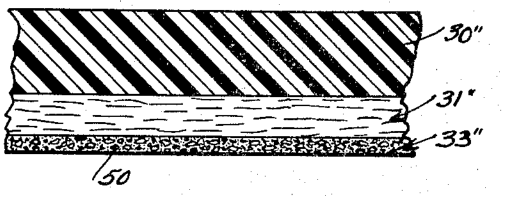
FIGURE 3 is a diagrammatic illustration of a further embodiment in accordance with the present invention.

FIGURE 3 illustrates a base 30″ having an oriented layer 31″ which may be longitudinally oriented and of material as described in connection with FIGURES 1 and 2. An aggregate of fine particles as indicated at 50 may be used for the top player 33″ having a range of sizes but similar magnetic properties to give the smoothest possible surface, magnetically and mechanically.

Figure 4:
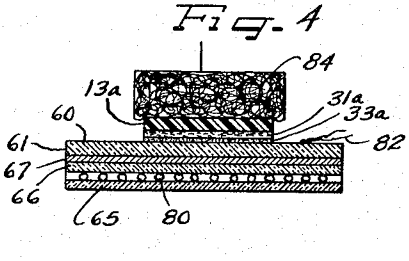
FIGURE 4 is a diagrammatic illustration of a method of smoothing the surfaces of the magnetic record media of FIGURES 1, 2 and 3.

Smoothing in any of the embodiments may be accomplished by the apparatus and method of FIGURE 4.

FIGURE 4 illustrates a tape magnetic record member 13*a* which has active magnetizable coating layers 31*a* and 33*a* with an active surface disposed in contact with a very smooth flat planar surface 60 of a plate 61, which is substantially smoother than the tape active surface and may for example be plate glass. This method is particularly desirable for use with magnetic discs, sheets and other flat record members of extended area.

Suitable means may be provided for heating surface 60 and the active tape surface to a temperature at which the tape surface will be in a plastic condition. By way of example, a suitable electrical heating element 65 is indicated which is distributed over the area of the plate 61 and separated therefrom by means of an asbestos or fiberglass layer 66 and an aluminum sheet 67, which may for example have a thickness of 1/16 inch. The heat conductive sheet 67 has the function of distributing heat over the entire undersurface of the plate 61 for uniform heating of the surface 60. The entire assembly may be supported on an asbestos board 80. The plate 61 may have a thickness of 1/4 inch.

By way of example, a tape was used which had a thermoplastic coating which softened in a certain temperature range, backed by a material having a considerably higher softening range. It was found that using a Minnesota Mining and Manufacturing Company "Scotch" brand magnetic recording tape having a polyester ("Mylar") base and known as Extra Play No. 150–18, and placing a thermocouple thermometer as indicated at 82 on the surface of the plate glass 61 and centrally thereof, that the tape surface was smoothed into conforming relation to the plate surface 60 at temperature readings of the order of 160° F. to 250° F. In general, it was found that the smoothness of the tape surface increased with increasing temperature, the upper limit being determined by the necessity for avoiding damage to the tape base 13*a*. Preferably the tape was pressed into contact with the heated surface 60, as by means of a felt pressure device 84 acting on the inactive surface of the base 13*a* of the tape, the felt pad being moved back and forth to iron out the tape and to force out any air bubbles or blisters. It is considered that for the particular tape above referred to, a temperature at the smoothing surface 60 of approximately 170° F. or greater is required for proper smoothing action. It has been found to be advantageous to cool the tape to room temperature before removing the same from the plate 61, although it may be stripped when only partially cooled, as long as the coating has hardened sufficiently.

It is found that the actual surface temperature is somewhat higher than the nominal temperature indicated by the thermocouple, and also that optimum temperature depends on the thermoplastic properties of the tape layer. The backing of the magnetic layer must be chosen so that it will withstand the temperature at which the magnetic layer becomes mobile. Once the proper conditions have been determined, they can be repeated by setting to the same nominal temperature.

It will be apparent that many modifications and variations may be effected without departing from the scope of the novel concepts of the present invention.

I claim as my invention:

1. A magnetic record member comprising a base having a first layer of elongated magnetizable particles oriented in the direction of travel of the base and having a second layer of elongated magnetizable particles oriented generally normal to the base.

2. A transducer system comprising a magnetic transducer head having a longitudinal gap, and a magnetic tape record member having a portion thereof in contact with the head at said gap and bridging across the gap, the record member having a first group of magnetizable particles of one orientation and having a second group of magnetizable particles of a second orientation different from said first orientation, the orientation of said first and second groups of particles generally corresponding to the configuration of the magnetic field produced by said head at said gap, the first group of particles being relatively remote from the gap and extending longitudinally in the direction across the gap, and the second group of particles being disposed relatively close to said gap and extending generally in the direction normal to the record member.

3. A record member comprising a base having a first layer of magnetizable particles oriented generally longitudinally of the base and having a second layer of magnetizable particles disposed in overlying relation to said first layer, said first layer comprising relatively coarse acicular magnetic particles of size of the order of from 1.5 to 0.25 micron and said second layer comprising relatively fine high coercive force particles of size less than about 0.03 micron.

4. A magnetic record comprising a member having an active surface which is to be scanned along a predetermined scanning path in recording signals on said member and in reproducing signals from said member, said member comprising a non-magnetic base having a first layer of elongated magnetizable particles oriented substantially in the direction of said scanning path and substantially parallel to said active surface and a second layer of magnetizable particles disposed in overlying relation to said first layer and providing said active surface of said member, said first layer comprising relatively coarse acicular magnetic particles of size from about 1.5 to .25 micron and said second layer comprising relatively fine magnetizable particles of size substantially finer than said particles of said first layer.

5. In combination with the record of claim 4 a magnetic head having a pair of poles spaced in the direction of said scanning path to define a scanning gap and movable relative to said active surface with said poles in sliding contact with said active surface over said scanning path, said magnetic poles defining a magnetic field in said member which is generally normal to said active surface in said second layer and which is predominantly parallel to said active surface in said first layer.

6. In combination, a magnetic record comprising a member having an active surface for scanning in a predetermined scanning direction in recording signals on said member and in reproducing signals from said member, said member comprising a non-magnetic base having a first layer of magnetizable particles oriented substantially in said scanning direction and substantially parallel to said active surface and a second layer of magnetizable particles disposed in overlying relation to said first layer and providing said active surface of said member, said second layer having a thickness not greater than the thickness of said first layer and comprising particles having a size substantially less than .25 micron, and said second layer being unoriented and comprising particles having a number of different orientations.

7. The combination of claim 6 with said first layer having a thickness of the order of .00025 inch and said second layer having a thickness of the order of .00005 to .0001 inch, and means for subjecting said member to magnetic fields having a configuration which is generally normal to said active surface in said second layer and predominantly parallel to said scanning direction in said first layer with said magnetic fields including frequency components corresponding to recorded wavelengths on the member both greater than the thickness of said second layer and smaller than the thickness of said second layer.

8. The combination of claim 7 with said second layer comprising particles having a size from about .03 to .01 micron or smaller.

9. A magnetic recording medium comprising a base, a first layer of ferromagnetic particles and a second layer of ferromagnetic particles, said first and second layers of ferromagnetic particles being dispersed in a binder secured to said base, and ferromagnetic particles making up said first layer being aligned substantially parallel to the plane of said base, said ferromagnetic particles making up said second layer being aligned substantially perpendicular to said base, and said second layer having a thickness of the order of two to three microns.

10. A magnetic recording medium comprising a base, a first layer secured to said base having a first plurality of ferromagnetic particles dispersed in a binder, said first plurality of particles being aligned in a direction parallel to the plane of said base, a second layer secured to said first layer having a second plurality of ferromagnetic particles dispersed in a binder, said second plurality of particles being aligned substantially perpendicular to the direction of alignment of said first plurality of particles and said second layer having a thickness of the order of two to three microns.

11. A magnetic recording medium comprising a base, a first layer of ferromagnetic particles and a second layer of ferromagnetic particles, said first and second layers of ferromagnetic particles being dispersed in a binder secured to said base, said ferromagnetic particles making up said first layer being aligned substantially parallel to the plane of said base, said ferromagnetic particles making up said second layer being aligned substantially perpendicular to said base, and said second layer having a thickness of the order of two to two and one-half mircons.

12. A magnetic recording medium comprising a base, a first layer secured to said base having a first plurality of ferromagnetic particles dispersed in a binder, said first plurality of particles being aligned in a direction parallel to the plane of said base, a second layer secured to said first layer having a second plurality of ferromagnetic particles dispersed in a binder, said second plurality of particles being aligned substantially perpendicular to the direction of alignment of said first plurality of particles and said second layer having a thickness of the order of two to two and one-half microns.

13. A magnetic recording medium comprising a base, a first layer of ferromagnetic particles and a second layer of ferromagnetic particles, said first and second layers of ferromagnetic particles being dispersed in a binder secured to said base, said ferromagnetic particles making up said first layer being aligned substantially parallel to the plane of said base, said ferromagnetic particles making up said second layer being aligned substantially perpendicular to said base, and said second layer having a thickness of the order of .00005 to .0001 inch.

14. A magnetic recording medium comprising a base, a first layer secured to said base having a first plurality of ferromagnetic particles dispersed in a binder, said first plurality of particles being aligned in a direction parallel to the plane of said base, a second layer secured to said first layer having a second plurality of ferromagnetic particles dispersed in a binder, said second plurality of particles being aligned substantially perpendicular to the direction of alignment of said first plurality of particles and said second layer having a thickness of the order of .00005 to .0001 inch.

15. A magnetic record comprising a member having an active surface which is to be scanned along a predetermined scanning path, said member comprising a first layer of magnetizable particles oriented substantially parallel to said scanning path and to said active surface and a second layer of magnetizable particles disposed in overlying relation to said first layer and providing said active surface of said member, the particles of said second layer being oriented substantially normal to said active surface.

16. A magnetic record comprising a member having an active surface which is to be scanned along a predetermined scanning path, said member comprising a first layer of magnetizable particles oriented substantially parallel to said scanning path and to said active surface and a second layer of magnetizable particles of size substantially smaller than the particles of said first layer disposed in overlying relation to said first layer and providing said active surface of said member, said first layer having a thickness in the direction normal to said active surface of at least about .00025 inch and said second layer having a thickness substantially less than the thickness of said first layer and substantially less than .00025 inch.

17. A magnetic record comprising a member having an active surface which is to be scanned along a predetermined scanning path, said member comprising a first layer of magnetizable particles oriented substantially parallel to said scanning path and to said active surface and a second layer of magnetizable particles of size substantially smaller than the particles of said first layer disposed in overlying relation to said first layer and providing said active surface of said member, said first layer having a thickness in the direction normal to said active surface of at least about .00025 inch and said second layer having a thickness substantially less than the thickness of said first layer and substantially less than .00025 inch, said particles of said second layer having a particle size from about .03 to .01 micron or smaller and said second layer having a thickness of not more than about .00005 inch.

18. A magnetic record comprising a member having an active surface which is to be scanned along a predetermined scanning path, said member comprising a first layer of magnetizable particles oriented substantially parallel to said scanning path and to said active surface and a second layer of magnetizable particles of size substantially smaller than the particles of said first layer disposed in overlying relation to said first layer and providing said active surface of said member, said first layer having a thickness in the direction normal to said active surface of at least about .00025 inch and said second layer having a thickness substantially less than the thickness of said first layer and substantially less than .00025 inch, said first layer comprising acicular particles of size from about 1.5 to .25 microns.

19. In combination, a magnetic record comprising a member having an active surface which is to be scanned along a predetermined scanning path, said member comprising a first layer of magnetizable particles oriented substantially parallel to said scanning path and to said active surface and a second layer of magnetizable particles disposed in overlying relation to said first layer and providing said active surface of said member, the particles of said second layer being oriented substantially normal to said active surface, and a magnetic head having a pair of magnetic poles spaced apart in the direction of said scanning path to define therebetween a scanning gap and movable relative to said active surface with said poles in sliding contact with said active surface along said scanning path, said magnetic poles defining a magnetic field in said member which is generally normal to said active surface in said second layer and which is predominantly parallel to said scanning path and to said active surface in said first layer.

20. In combination, a magnetic record comprising a member having an active surface which is to be scanned along a predetermined scanning path, said member comprising a first layer of magnetizable particles oriented substantially parallel to said scanning path and to said active surface and a second layer of magnetizable particles of size substantially smaller than the particles of said first layer disposed in overlying relation to said first layer and providing said active surface of said member, said first layer having a thickness in the direction normal to said active surface of at least about .00025 inch and said second layer having a thickness substantially less than the thickness of said first layer and substantially less than .00025 inch, and a magnetic head having a pair of poles spaced in the direction of said scanning path and defining therebetween a scanning gap and movable relative to said active surface with said poles in sliding contact with said active surface over said scanning path, said magnetic poles defining a magnetic field in said member which is generally normal to said active surface in said second layer and which is predominantly parallel to said scanning path and to said active surface in said first layer, said scanning gap of said magnetic head having a dimension in the direction of said scanning path of the order of the thickness of said first layer but substantially greater than the thickness of said second layer.

References Cited by the Examiner

UNITED STATES PATENTS

| | | | |
|---|---|---|---|
| 2,418,479 | 4/47 | Pratt et al. | 117—64 |
| 2,643,130 | 6/53 | Kornei | 274—41.4 |
| 2,689,167 | 9/54 | Dovey | 274—41.4 |
| 2,691,072 | 10/54 | Mathes | 179—100.2 |
| 2,711,901 | 6/55 | Von Behren | 274—41.4 |
| 2,714,133 | 7/55 | Barry | 179—100.2 |
| 2,796,359 | 6/57 | Speed | 117—62 |
| 2,799,709 | 7/57 | Dalton. | |
| 3,023,166 | 2/62 | Duinker et al. | 179—100.2 |
| 3,052,567 | 9/62 | Gabor et al. | |

FOREIGN PATENTS

| | | |
|---|---|---|
| 587,916 | 11/33 | Germany. |

OTHER REFERENCES

Pages 72, 73, 78 and 79, 1957, Elements of Magnetic Tape Recording by Haynes.

IRVING L. SRAGOW, *Primary Examiner.*

L. MILLER ANDRUS, STEPHEN W. CAPELLI, ELI J. SAX, WALTER W. BURNS, JR., *Examiners.*